United States Patent [19]
Pollock

[11] 3,819,927
[45] June 25, 1974

[54] RETRACTABLE DIRECTIONAL LIGHTS FOR TRUCK TRAILER VEHICLES

[76] Inventor: Howard D. Pollock, 478 Flagler Ln., Poland, Ohio 44511

[22] Filed: Dec. 18, 1972

[21] Appl. No.: 316,393

[52] U.S. Cl............ 240/8.22, 240/7.1 R, 240/8.24, 240/57
[51] Int. Cl............................ B60g 1/32, B60g 1/48
[58] Field of Search............. 240/7.1, 7.1 F, 7.1 H, 240/8.2, 8.22, 8.24, 8.25, 8.3, 57, 61.11, 61.12, 61.13

[56] References Cited
UNITED STATES PATENTS

| | | | |
|---|---|---|---|
| 1,771,086 | 7/1930 | Hyatt | 240/7.1 H |
| 2,677,752 | 5/1954 | Kaiser | 240/7.1 R |
| 2,796,515 | 6/1957 | Waskie | 240/7.1 R |
| 2,996,606 | 8/1961 | Klar | 240/61.13 X |
| 3,596,079 | 7/1971 | Clark | 240/7.1 R |

FOREIGN PATENTS OR APPLICATIONS

| | | | |
|---|---|---|---|
| 564248/57 | 6/1957 | Italy | 240/7.1 H |
| 1953593 | 3/1971 | Germany | 240/57 |

Primary Examiner—Richard M. Sheer
Attorney, Agent, or Firm—Webster B. Harpman

[57] ABSTRACT

A mounting structure positioned on a truck-tractor adjacent the cab is provided with outwardly and downwardly movable spotlight assemblies selectively directed rearwardly along the sides of the trailer. Apparatus is provided in the mounting structure for imparting movement to the spotlight assemblies and a remotely controlled switch is provided for selectively illuminating the spotlights.

7 Claims, 3 Drawing Figures

RETRACTABLE DIRECTIONAL LIGHTS FOR TRUCK TRAILER VEHICLES

BACKGROUND OF THE INVENTION

1. Field of the Invention

This invention relates to movable lighting assemblies for selectively illuminating areas to the rear of and beside a truck-tractor and trailer vehicle.

2. Description of the Prior Art

The prior art includes swivel lamps mounted in doors of vehicle as in U.S. Pat. No. 2,677,752, sidewardly or longitudinally extensible light fixtures as in U.S. Pat. No. 2,686,252 and 2,796,515. Combinations of lights with other devices usable on motor vehicles may be seen in U.S. Pat. No. 3,596,079.

This invention provides retractable spotlight assemblies for a truck-tractor-trailer vehicle that eliminates problems heretofore existing in connection with attempts to illuminate the backup path of a trailer relative to the truck-tractor driving unit.

SUMMARY OF THE INVENTION

A retractable directional light assembly for truck-tractor vehicles includes a mounting structure positioned transversely of the vehicle, forwardly of the trailer and having spotlight assemblies normally enclosed thereby and movable outwardly therefrom on an angular path so as to provide differently aimed spotlights in positions where they will selectively illuminate the various rearward and sideward paths a trailer will follow when being backed by the truck-tractor vehicle. Remotely controlled means acts to move the spotlight assemblies to operating position and return them to retracted enclosed position and still other remotely actuated means may be used to selectively illuminate the desired spotlights of each of the assemblies.

DESCRIPTION OF THE PREFERRED EMBODIMENT

Figure 1:
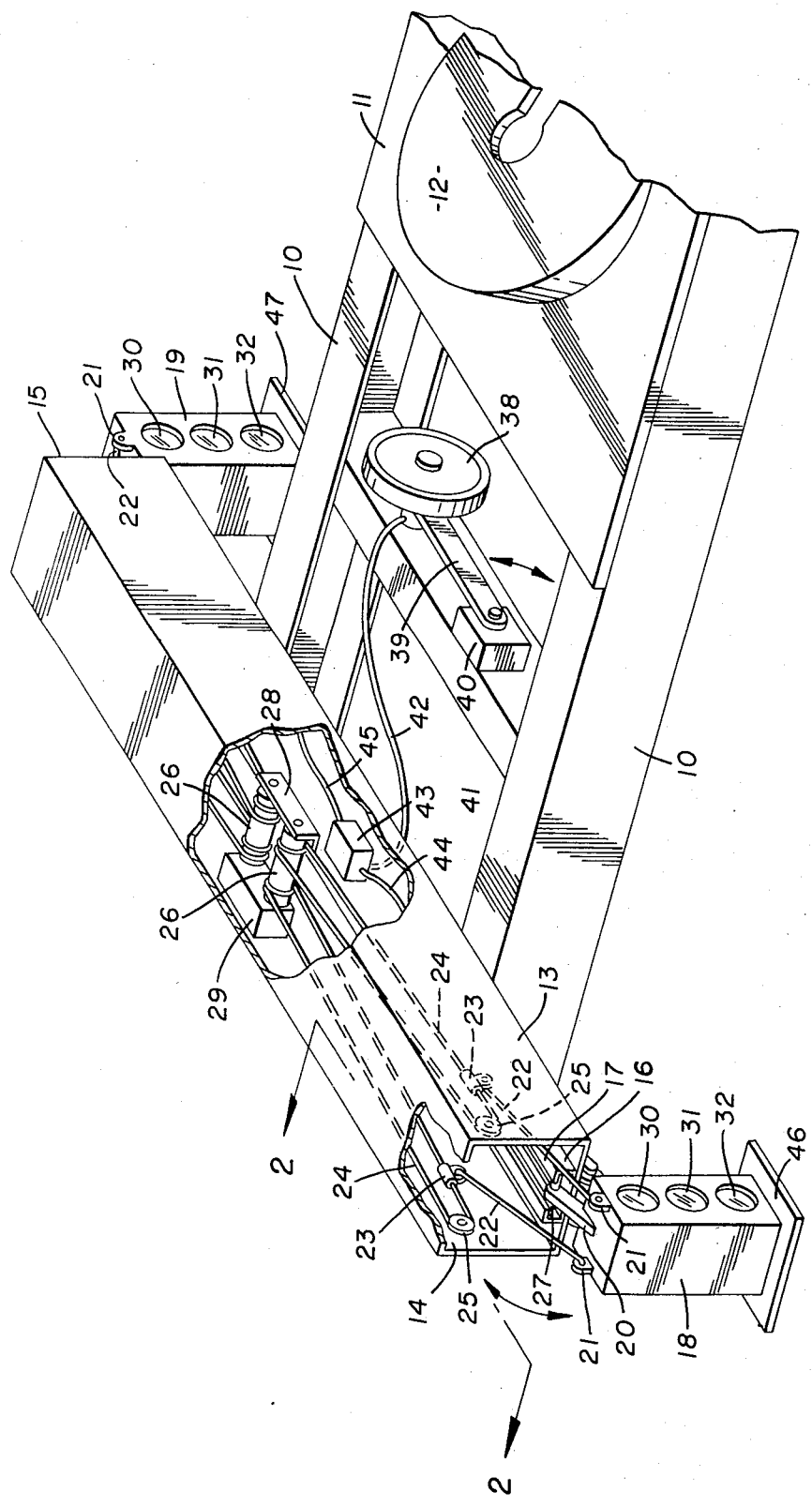
FIG. 1 is a perspective elevational view with parts broken away of a portion of a truck-tractor vehicle and the retractable directional lights therefore in position thereon.

In its simplest form the retractable directional lights for truck-tractor vehicles is disclosed in FIG. 1 in connection with frame members 10 of a truck-tractor unit which is provided with a transverse platform 11 having a trailer mounting fifth wheel 12 thereon. The device of the invention includes a mounting structure 13 taking the form of an open ended, cross sectionally square housing, the open ends of which are indicated at 14 and 15 respectively.

Channel members 16 with inturned flanges 17 defining a slot therebetween are positioned longitudinally and centrally of the bottom of the mounting structure 13 and inwardly from the open ends 14 and 15 thereof. Spotlight assembly bodies 18 and 19 having angularly extending arms 20 and their upper ends are provided-,each of the bodies 18 being of a size movable into and out of the open ends 14 and 15 of the housing defining the mounting structure 13. Brackets 21 on the upper ends of the bodies 18 and 19 are pivotally connected to links 22 which are in turn pivoted to clamps 23 secured to endless cables 24 trained over pulleys 25 and drive rolls 26 positioned in the housing defining the mounting structure 13.

In order that the bodies members 18 and 19 may be guided into and out of the open ends 14 and 15 of the housing defining the mounting structure 13, transverse guides 27 are positioned in the upper outer ends of the arms 20 and engaged for sliding movement in the channels 16 heretofore referred to. The drive rolls 26 are journeled in appropriate bearings in a bracket 28 secured to one of the inner walls of the housing defining the mounting structure 13. A motor and reduction gear mechanism is enclosed in a box 29 which is also positioned within the housing defining the mounting structure 13 and the drive rolls 26 are engaged with the gears thereof for movement thereby.

Figure 2:
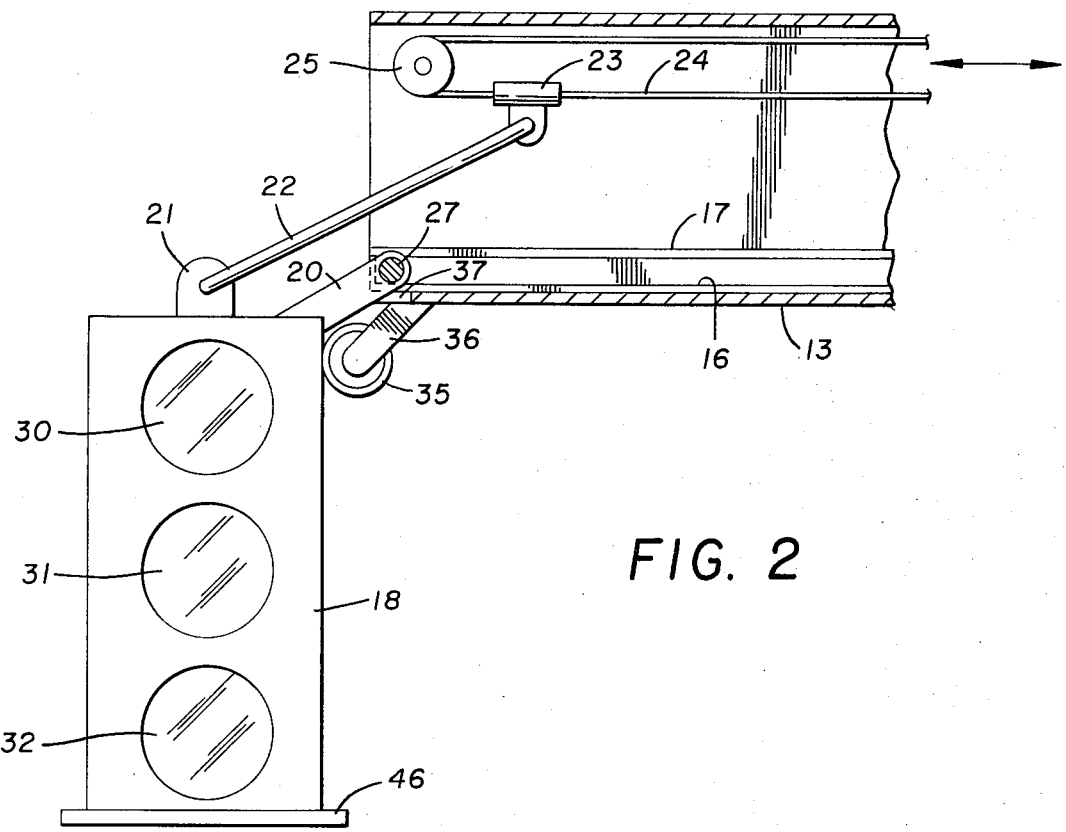
FIG. 2 is an enlarged cross sectional elevation on lines 2—2 of FIG. 1.

Still referring to FIGS. 1 and 2 of the drawings, it will be seen that each of the spotlight assembly bodies 18 and 19 have a plurality of spotlights 30, 31 and 32 positioned therein and directed toward the rear of the tractor-trailer vehicle on which the device is positioned.

Figure 3:
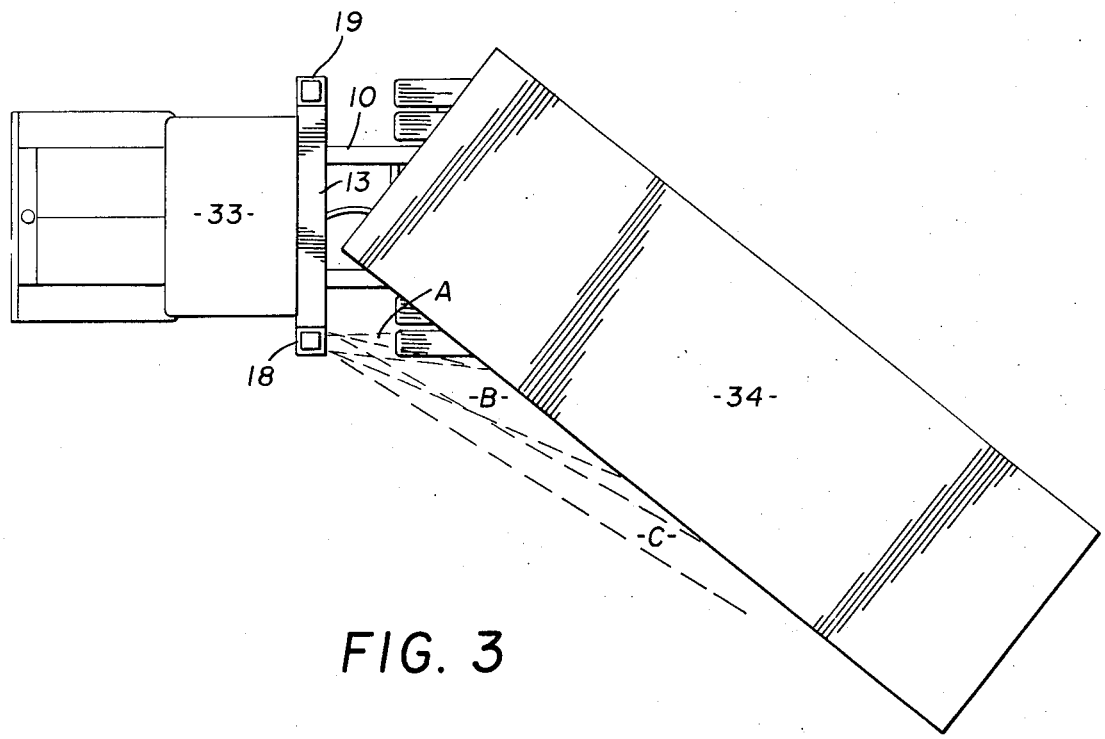
FIG. 3 is a top plan view of a truck-tractor and trailer vehicle showing the spotlight assemblies in operational position and broken lines illustrating the spotlight beams.

By referring to FIG. 3 of the drawings it will be seen that the spotlights 30, 31 & 32. are arranged to direct their light beams in three patterns, A, B and C which illuminate the areas directly behind the truck-tractor-trailer vehicle, the areas immediately to the sides thereof and the areas substantially to the sides thereof respectively. In FIG. 3 of the drawings, the cab of the truck-tractor is indicated by the numeral 33 and the trailer by the numeral 34.

By again referring to FIG. 2 of the drawings it will be seen that a transversely extending guide roll 35 is positioned on outwardly and downwardly extending arms 36 at either end of the open end housing defining the mounting structure 13 and that slots 37 are formed inwardly of the ends of the bottom portions thereof to facilitate operation of the arms 20 when the same is moved to the position illustrated in FIG. 2 of the drawings.

Those skilled in the art will observe that it is possible to utilize the movement of the trailer 34 relative to the frame 10 of the truck tractor vehicle to selectively illuminate the spotlights 30, 31 and 32 and by referring to FIG. 1 of the drawings such a mechanism will be seen to comprise a wheel 38 rotatably mounted on the end of an arm 39 which in turn is provided to and moved by actuating means in a housing 40 secured to a transverse frame member 41 of the truck-tractor. An actuating mechanism in the housing 40 may include an electric motor and a gear reduction set driving the pivots to which the arm 39 is secured so as to move the arm in an arc upwardly from the position illustrated to a second position where the wheel 38 will contact the lower surface of the forward end of the trailer 34 and thereby be in a position to be rotated by such motion as the trailer 34 pivots relative to the frame 10 of the truck-tractor vehicle.

A flexible cable 42 driven by the wheel 38 and its axle extending through the arm 39 may extend to a rotory switch 43 positioned within the housing defining the mounting structure 13 where it will control electrical circuits 44 and 45 which extend to the spotlights 30, 31 and 32 in each of the spotlight assembly bodies 18 and 19 as heretofore described.

Alternately, the spotlights 30, 31 and 32 in the spotlight assembly bodies 18 and 19 may be remotely controlled by the operator of the truck-tractor vehicle.

OPERATION

When the device of the invention is to be used to illuminate the area to the rear and sides of a truck-tractor vehicle as desirable in backing the trailer at nighttime, a remote switch, not shown, is used to energize a circuit in driving the reversible motor in the motor and gear reduction unit 29 which will cause the drive rolls 26 to rotate in opposite directions thereby moving the cables 24 and the clamps 23 thereon toward the open ends 14 and 15 of the housing defining the mounting structure 13. The motion is imparted to the spotlight assembly bodies 18 and 19 by the links 22 and the bodies 18 and 19 are guided outwardly and downwardly by the arms 20 and their transverse guides 27 following the channels 16. The bodies 18 and 19 move outwardly and downwardly over the transverse rollers 35 and into the position seen in FIG. 1 and 2 of the drawings where limit switches, not shown, are actuated to stop the motor in the motor and gear box 29.

The spotlights 30, 31 and 32 may then be energized by a remote switch not shown, and individually selected by the operator or the selection made automatically by the rotary switch 43 hereinbefore described which is controlled by the turning motion of the trailer 34 relative to the frame 10 of the tractor-trailer vehicle. In either event the desired spotlights 30, 31 and 32 are illuminated and the backing path of the truck, tractor and trailer adequately and desirably illuminated.

At such time as the illumination is no longer needed the motor in the motor and gear box Unit 29 is reversed and energized to move the cables 24 oppositely to the hereinbefore described motion and thereby move the clamps 23, the links 22 and the bodies 18 and 19 upwardly and inwardly of the open ended housing defining the mounting structure 13. This action continues until end closures 46 and 47 on the bodies 18 and 19 register with the open ends 14 and 15 and limit switches stop the motor in the motor and gear box 19.

From the foregoing it will be seen that a retractable directional light assembly for a truck-tractor and trailer vehicle has been disclosed which may be easily mounted on a truck-tractor frame adjacent the cab thereof and will operate to desirably illuminate the backing path of the truck-tractor and trailer vehicle at such time as the same is desired and that all other times the light units thereof are retracted within the mounting structure of the device and enclosed thereby for protection against the weather or other elements.

Although but one embodiment of the present invention has been illustrated and described, it will be apparent to those skilled in the art that various changes and modifications may be made therein without departing from the spirit of the invention.

I claim:

1. A retractable directional light assembly for truck-tractor and trailer vehicles comprising an elongated housing having open ends positioned transversely of the vehicle, spotlight containing body members having a plurality of spotlights positioned therein to illuminate different adjacent areas, said body members being movably positioned in said housing for movement into and out of the open ends thereof from a horizontal retracted position within said housing to an extended position outwardly of and perpendicular to said housing, means in said housing for imparting movement to said spotlight containing body members, said means including pivot means for pivoting said body members from said horizontal retracted position to said perpendicular extended position, and means for selectively illuminating said spotlights so that different adjacent areas are illuminated.

2. The light assembly set forth in claim 1 and wherein the means for imparting movement to the body members comprises a drive means, pulleys in said housing and cables extending from said drive means and over said pulleys, links connecting said cables with said body members.

3. The light assembly set forth in claim 1 and wherein guide means is located in said housing and guide members positioned on said body members slidably engage said guide means.

4. The light assembly set forth in claim 1 and wherein said means for selectively illuminating said spotlights comprises a remotely located switch.

5. The light assembly set forth in claim 1 and wherein closures are positioned on said body members and arranged for closing engagement with said open ends of said housing when said body members are positioned therein.

6. The light assembly set forth in claim 1 and wherein said open end housing is tubular.

7. The light assembly set forth in claim 1 and wherein said means for selectively illuminating said spotlights comprises energizing circuits, a switch device, therefor, a wheel movable into and out of engagement with a trailer, means for connecting said wheel and said switch device so as to actuate said switch device responsive to motion of said wheel as occasioned by relative movement of a trailer with respect thereto.

* * * * *